June 9, 1959     J. D. HAYES ET AL     2,889,745
WIDE ANGLE ATTACHMENT FOR OBJECTIVE LENSES
Filed Feb. 10, 1958
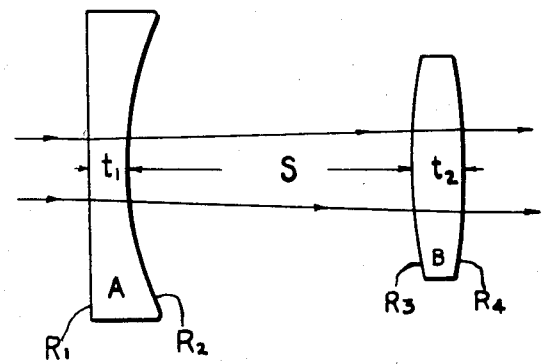
| E.F. POS. = 100; E.F. NEG. = 71 | | | $f/1.8$ F.A. = 37° | | |
|---|---|---|---|---|---|
| LENS | CURVES | THICKNESS | SPACING | $n_D$ | $v$ |
| A | $R_1 = \infty$ | $t_1 = 4.0$ | $S = 26.96$ | 1.5170 | 64.5 |
| | $R_2 = +36.71$ | | | | |
| B | $R_3 = +122.14$ | $t_2 = 6.52$ | | 1.6170 | 36.6 |
| | $R_4 = -122.14$ | | | | |
INVENTORS
JOHN D. HAYES
BY   LENA M. HUDSON
*ATTORNEY*

United States Patent Office 2,889,745
Patented June 9, 1959

2,889,745

WIDE ANGLE ATTACHMENT FOR OBJECTIVE LENSES

John D. Hayes, Rochester, and Lena M. Hudson, Brighton, N.Y., assignors to Bausch & Lomb Optical Company, Rochester, N.Y., a corporation of New York Application February 10, 1958, Serial No. 714,145

3 Claims. (Cl. 88—57)

This invention relates to objective lenses and more particularly it relates to the lens system of a wide angle attachment of the reversed telephoto type for such objectives.

Wide angle attachments of the reversed telephoto type have been used in the photographic art for many years to provide an enlarged angular field of view and a shorter equivalent focus for a photographic objective. The present development of such attachments is best exemplified by the Patent 2,324,057, issued to Harold F. Bennett on July 13, 1943, which discloses a highly perfected but comparatively expensive form of optical system. Currently, there is a need for a low-cost wide angle attachment of simple form and of high grade performance for use in photographic apparatus and particularly for the popular low priced camera.

It is an object of this invention to provide a novel wide angle attachment of the above-mentioned kind for photographic objectives.

It is a further object to provide such a device having constructional properties, including lens curvatures and thicknesses, which are readily manufactured by the least expensive processes and procedures, and particularly it is our purpose to provide a form of lens system which permits a generous range in individual lens thicknesses while maintaining a high grade of correction of all image errors. Further objects and advantages reside in the details of construction as described in the specification herebelow and as shown in the accompanying drawing in which the single figure therein represents a preferred form of our invention.

With reference to the drawing, the aforesaid preferred form of our lens system for wide angle attachments is of the reversed telephoto type and it consists of a negative or dispersive lens A positioned on the front or long conjugate side of said system in optical alignment with and afocally spaced from a rearwardly positioned positive or collective lens B. Lens A is provided with a plano front surface $R_1$ and a concave rear surface $R_2$ of large radius, both of said surfaces being easy and inexpensive to manufacture, test and assemble by the ordinary machinery and procedures used in lens fabrication. Lens B is provided with a convex surface $R_3$ on its front side and a duplicate convex surface $R_4$ on its rear side so that it is reversible and consequently cannot be carelessly assembled backward in its mounting. Since the refractive surfaces $R_3$ and $R_4$ are of very shallow curvature, lens B does not produce any considerable amount of spherical aberration such as found in deeply curved lenses. This fact is also true of lens A and yet the curvatures $R_2$, $R_3$ and $R_4$ are great enough to facilitate optical centering thereof, but said curvatures are in the form which is most conducive to very inexpensive manufacture by simple and ordinary operations and procedures. In this particular example of such a lens system, the equivalent focal length E.F. of the dispersive lens A is 71 and the E.F. of the collective lens B is 100 and since these lenses are afocally mounted with respect to each other, the magnification of the system is .71 and in any contemplated form it is less than unity.

One of the noteworthy advantages of this particular form of optical system is that the thicknesses $t_1$ and $t_2$ of the lenses A and B, respectively, may be varied through a considerable range away from their nominal values without impairing the excellent correction of image aberrations that is obtained when said values are nominal. Because of this feature, the thickness tolerances or specifications of these lenses may be relaxed and broadened sufficiently to effect a marked reduction in the cost of manufacture and inspection. Accordingly, the value for $t_1$ in the particular illustrated and described optical system may vary from .03 to .05 of the E.F. of lens B, and the value for $t_2$ may vary from .055 to .075 of the E.F. of lens B without substantially deteriorating the high grade correction of all image aberrations of said system such as spherical and chromatic aberrations, astigmatism, coma, distortion, sine condition, distortion and field curvature, which are obtained by the use of said nominal values. Furthermore, the thicknesses $t_1$ and $t_2$ of said lenses in our novel lens system are advantageously small, resulting in a reduction in the amount of glass required for manufacturing and a commensurate reduction in the height and cost of the wide angle attachment. The wide angle attachment, embodying our invention, may be used with various standard forms of objective lenses.

One specific form of our invention is shown in the figure of the drawing together with the accompanying table wherein the following constructional data are given:

[E.F. of A lens=71. E.F. of B lens=100. f/1.8. F.A.=37°.]

| Lens | Radii of Curvatures | Thickness | Spacing | $n_D$ | $\nu$ |
|---|---|---|---|---|---|
| A | $R_1=\infty$<br>$R_2=+36.71$ | $t_1=4.0$ | S=26.96 | 1.5170 | 64.5 |
| B | $R_3=+122.14$<br>$R_4=-122.14$ | $t_2=6.52$ | | 1.6170 | 36.6 | wherein:

E.F. designates equivalent focus,
F.A. designates the field angle,
$n_D$ designates the refractive index for the D line of the spectrum of the glass
$\nu$ designates the Abbe number or dispersion of said glass.

This combination of constructional data provides an optical system of extreme simplicity and low cost having the capability of forming a highly corrected photographic image as good as the performance of many more costly lens systems.

Although only one form of our invention has been shown and described in detail, other forms are possible and changes may be made in the constructional details without departing from the spirit of the invention as stated in the appended claims.

We claim:

1. A lens system of a wide angle attachment for photographic objectives, said system having a numerical aperture of at least f/1.8 and being corrected for spherical and chromatic aberrations, astigmatism, distortion, coma, sine condition and field curvature, said system consisting of a single plano concave negative lens having the plano surface thereof located on the side toward the object, and a single positive lens of double convex form having the same curvature on both surfaces and spaced afocally rearwardly from the negative lens and in optical alignment therewith and constructed so as to provide a magnification for said system of substantially .71, the axial thickness for said negative lens being within the range of .03 to .05 of the equivalent focus of the positive lens and the axial thickness of the positive lens being within the range of .055 to .075 of said equivalent focus, and the spacing between said negative and positive lens being substantially .27 of said equivalent focus whereby the value of each said thickness may vary away from its nominal value within the aforesaid range without substantially changing the high quality of correction for the aforesaid image aberrations.

2. A lens system of a wide angle attachment for photographic objectives, said system having a numerical aperture of at least $f/1.8$ and being corrected for spherical and chromatic aberrations, astigmatism, distortion, coma, sine condition and field curvature, said system consisting of a single negative lens located on the long conjugate side thereof and a single positive lens optically aligned afocally rearwardly thereof and constructed so as to cooperatively provide a magnification of substantially .71 for said system, said system having constructional data as given herebelow:

E.F. (neg. lens) = 71.0
E.F. (pos. lens) = 100.0
$R_1 = \infty$ ⎫ Neg. lens
$R_2 = +36.71$ ⎭
$R_3 = +122.14$ ⎫ Pos. lens
$R_4 = -122.14$ ⎭
$t_1 = .03$ to $.05 \times$ (E.F. of positive lens)
$t_2 = .055$ to $.075 \times$ (E.F. of positive lens)
$S = 26.96$ where E.F. designates the equivalent focus of the respective lenses, $R_1$ to $R_4$ designate the radii of curvature of the refractive surfaces of the negative and positive lenses numbering from the long conjugate side, $t_1$ and $t_2$ designate the axial thicknesses of the respective lenses similarly numbered, and S designates the space between said lenses whereby the values of said thicknesses may vary within their respective given ranges away from the nominal values without substantially changing the high quality of correction for the aforesaid image aberrations.

3. A lens system of a wide angle attachment for photographic objectives, said system having a numerical aperture of at least $f/1.8$ and a magnification of substantially .71 and consisting of a single negative lens located on the long conjugate side of said system and a single positive lens optically aligned afocally rearwardly thereof, said system being corrected for spherical and chromatic aberrations, astigmatism, distortion, coma, sine condition, and field curvature, said system having constructional data as given herebelow:

E.F. (neg. lens) = 71.0
E.F. (pos. lens) = 100.0
$R_1 = \infty$
$R_2 = +36.71$
$R_3 = +122.14$
$R_4 = -122.14$
$t_1 = 4.0$
$t_2 = 6.52$
$S = 26.96$
$n_D = 1.517$ (neg. lens)
$n_D = 1.617$ (pos. lens)
$\nu = 64.5$ (neg. lens)
$\nu = 36.6$ (pos. lens)

where E.F. designates the equivalent focus of the respective lenses, $R_1$ to $R_4$ designate the radii of the refractive surfaces numbering from the long conjugate side, $t_1$ and $t_2$ designate the axial thicknesses of the respective lenses similarly numbered, S designates the space between said lenses, $n_D$ designates the refractive index of the glass, and $\nu$ designates the Abbe number or dispersion of the glass.

References Cited in the file of this patent

UNITED STATES PATENTS

| | | |
|---|---|---|
| 1,138,217 | Holst | May 4, 1915 |
| 1,651,493 | Warmisham | Dec. 6, 1927 |
| 1,934,561 | Rayton | Nov. 7, 1933 |
| 2,184,018 | Ort | Dec. 19, 1939 |
| 2,324,057 | Bennett | July 13, 1943 |
| 2,590,917 | Back et al. | Apr. 1, 1952 |
| 2,800,052 | Bechtold et al. | July 23, 1957 |

FOREIGN PATENTS

| | | |
|---|---|---|
| 722,817 | France | Jan. 5, 1932 |